April 12, 1949. W. TRUBENBACH 2,467,346
AIR CLEANING APPARATUS
Filed June 6, 1947 3 Sheets-Sheet 1
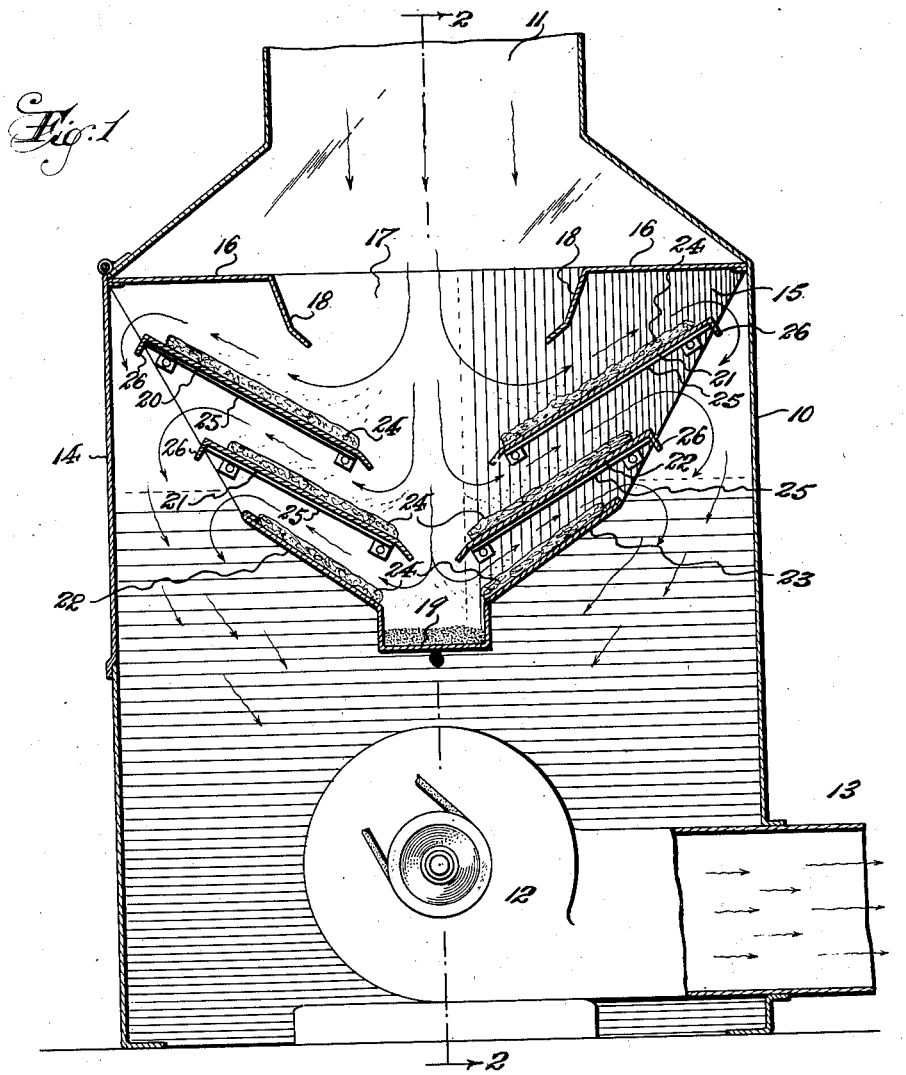
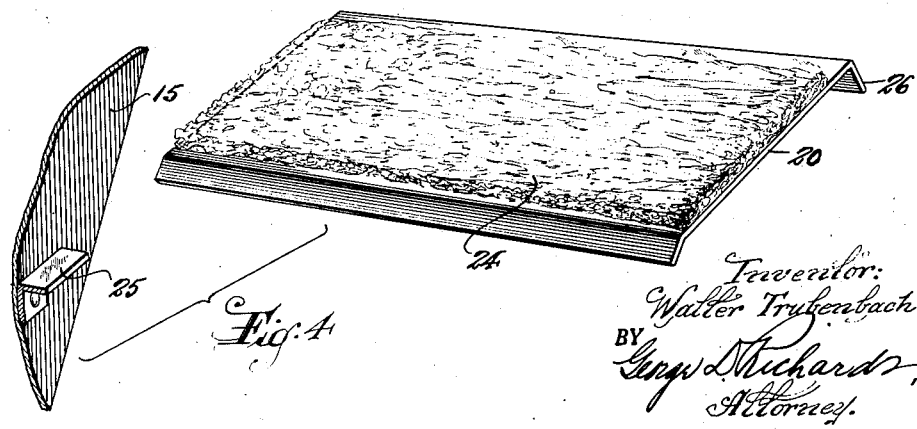
Inventor:
Walter Trubenbach
BY George L. Richards
Attorney.

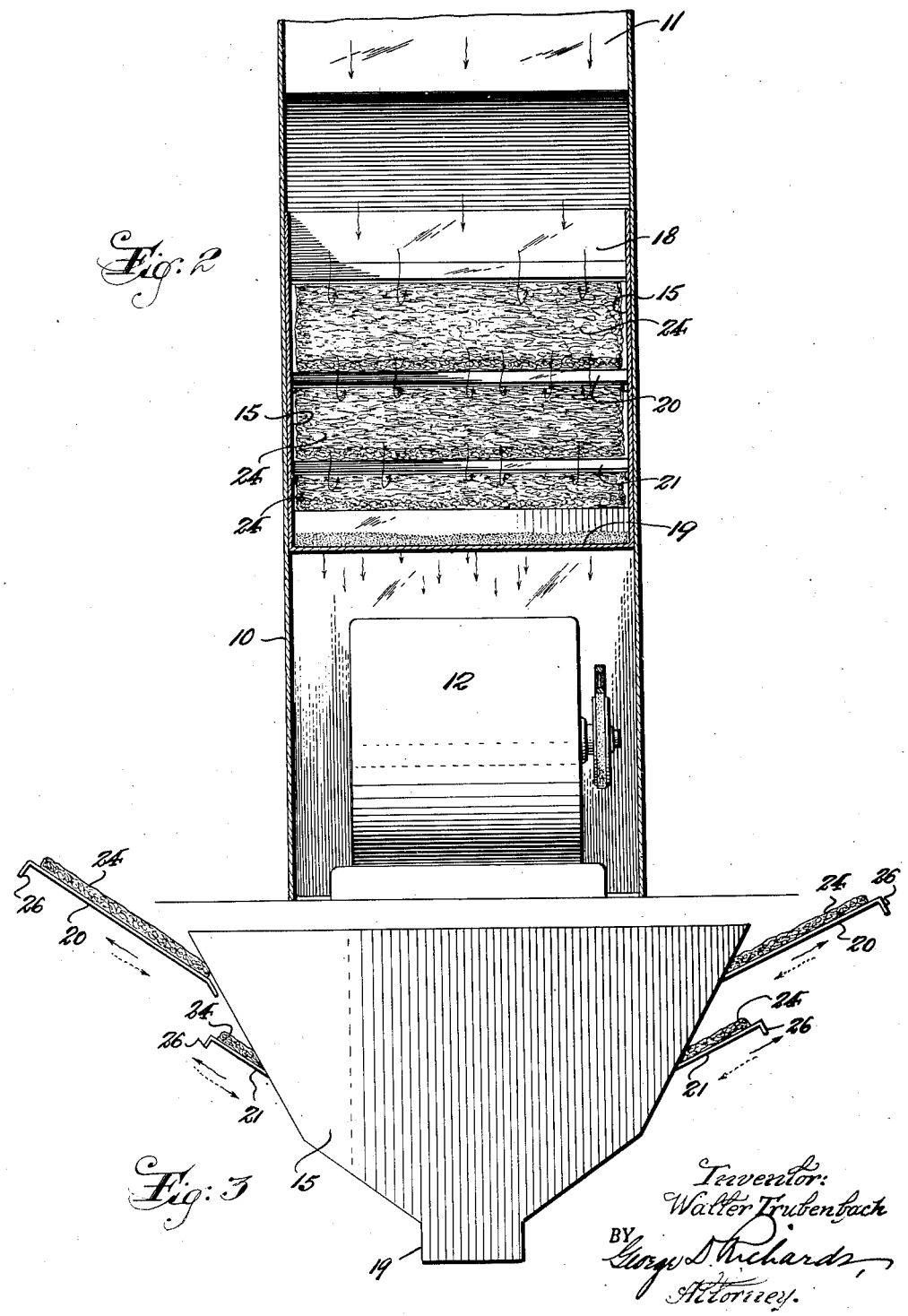

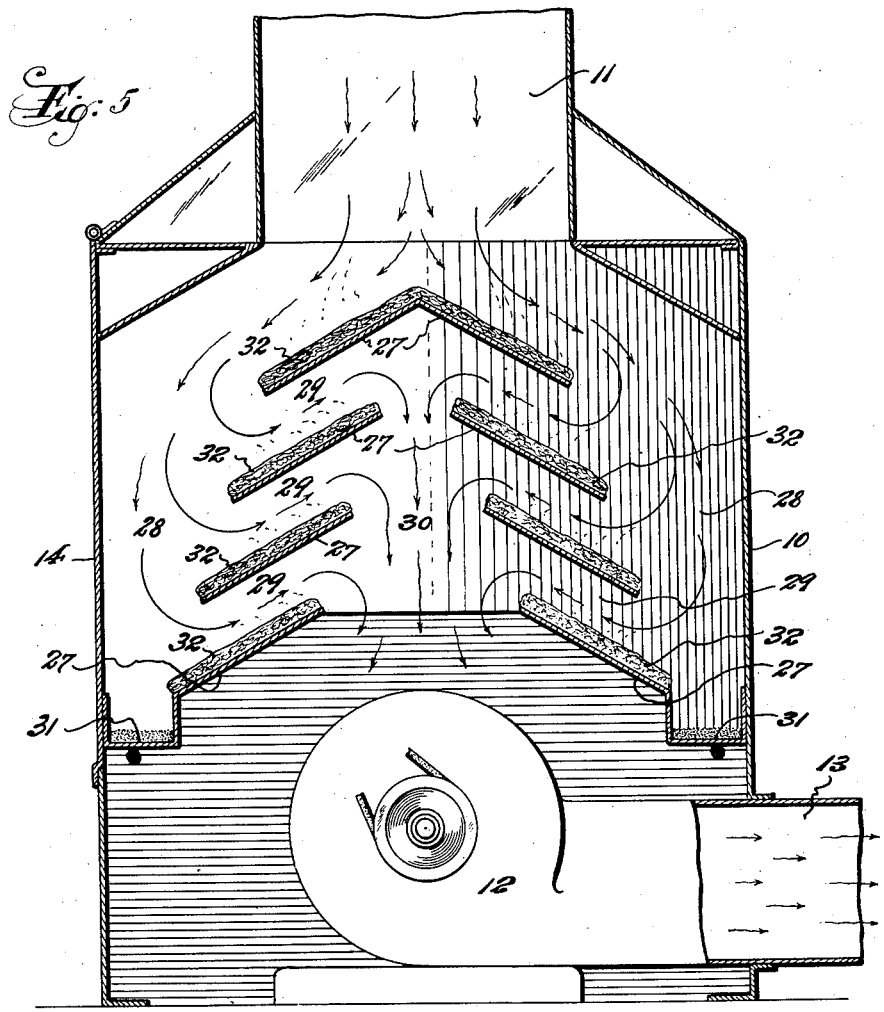
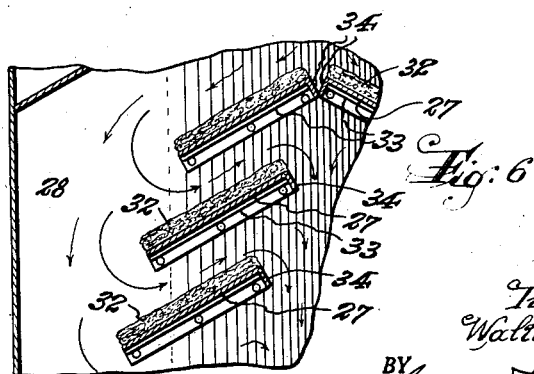

Patented Apr. 12, 1949

2,467,346

UNITED STATES PATENT OFFICE 2,467,346

AIR CLEANING APPARATUS

Walter Trubenbach, East Orange, N. J.

Application June 6, 1947, Serial No. 753,075

3 Claims. (Cl. 183—107)

This invention relates to improvements in air cleaning means for general use, but which is especially well adapted for use in hot and/or cold air conditioning systems for buildings.

Modern hot and/or cold air conditioning systems usually include, at the air intake thereof, means to remove from the entering air stream, which is to be conditioned and eventually delivered into the premises served by the system, dust, dirt, soot particles or the like which may be suspended therein, whereby to discharge clean air, substantially free from suspended solids, into said premises. As heretofore provided, most air cleaners used for the aforesaid purpose include interstitial filter masses through which the entering air must pass, and, consequently, not only is considerable undesirable resistance to and restriction of air flow set up, but such resistance and restriction is constantly and progressively increased as the filter masses accumulate and choke up with dust and other solids removed thereby from the air stream.

Having such undesirable factors in view, it is an object of this invention to provide a novel construction of air cleaner means which is substantially free from air flow resistance and restriction.

Another object of this invention is to provide a novel construction of air cleaner means wherein the air passing therethrough is caused to change direction, so that relatively heavy particles of dust and other solids are caused, by their momentum and inertia, to be precipitated out of the air stream subject to deposit and collection in trapping compartment or catch basin means.

A further object of the invention is to provide an air cleaner means wherein, in addition to means for causing changes of direction of air stream movement, the air flow is directed so as to impinge on masses of interstitial material disposed contiguous to the path of flow; said material being operative to arrest movement of suspended dust and other solids, and thus separate the same from the air stream.

Another object of the invention is to provide a novel air cleaner unit characterized as above described which is adapted to be removably mounted within an air intake housing or passage, whereby the unit may be removed therefrom at will for cleaning; and also wherein means is also provided for detachably supporting the interstitial separator material subject to removal for cleaning or replacement.

Other objects of the invention, not at this time more particularly enumerated, will be understood from the following detailed description of the same.

Illustrative embodiments of this invention are shown in the accompanying drawings, in which:

Fig. 1 is a transverse vertical sectional view through an air intake housing or passage equipped with one portion of the novel air cleaner means according to this invention; Fig. 2 is another vertical cross sectional view of the same, taken on line 2—2 in Fig. 1; Fig. 3 is an end elevational view of the air cleaner unit per se, showing certain of the dust separator material trays disposed for movement into or out of operative mounted relation to and within the air cleaner unit; and Fig. 4 is a perspective view of one of the dust separator trays, including a fragmentary portion of an end wall of the unit and its tray supporting means.

Fig. 5 is a transverse vertical sectional view of an air intake housing or passage equipped with a modified form of air cleaner means embodying the principles of this invention; and Fig. 6 is a fragmentary similar sectional view thereof showing a removable arrangement of the dust separator trays thereof.

Similar characters of reference are employed in the hereinabove described views, to indicate corresponding parts.

Referring to Figs. 1 to 4 inclusive, a preferred embodiment of this invention, as therein shown, comprises any suitable form and construction of air intake housing 10 having an air inlet or delivery means 11 at its upper end, and, within its lower interior a suitably driven air discharge blower or fan 12, the outlet duct 13 of which extends exteriorly from the housing 10, for communication with suitable air conditioning means (not shown) by which the air is treated before admission to the premises served by said latter means.

Suitably supported within the upper interior of said air intake housing 10, so that air entering through the air inlet or delivery means 11, must pass therethrough before it is expelled from the housing by the blower or fan 12, is an air cleaning means embodying the principles of the instant invention.

In a preferred embodiment thereof, the air cleaning means is constructed in a form adapted to provide an independent unit which may be removably mounted within the upper interior of the air intake housing 10; the latter being provided with a movable door 14 which, when opened, gives access to the interior of the housing 10 so as to permit insertion or removal of the air cleaning units as desired. In such removable form, the air cleaning unit comprises end walls 15 spaced apart to fit within the housing 10 entirely across the cross-sectional area thereof. Connected between the upper margins of said end walls 15 are top wall sections 16 which extend, one toward the other, from opposite sides of the unit, but which terminate short of each other so as to provide an intermediate central air admission opening 17. Extending downwardly and inwardly from the inner margins of said top wall sections 16 are oblique deflector flanges 18, which serve to direct the air entering the unit through the opening 17 so as to form an initial centrally disposed down flowing air stream within the unit interior. At its bottom end, the unit is formed to provide a centrally disposed trapping compartment or catch basin 19 which is connected between the lower end portions of the end walls 15, so as to be spaced a substantial distance from and below the air admission opening 17. The opposite sides of the unit are open to the interior of the intake housing 10, and extending inwardly into the unit interior from said opposite open sides thereof and between its end walls 15 are a plurality of vertically spaced apart, upwardly and outwardly inclined trays, shelves or partitions. Said trays, shelves or partitions, as illustratively shown, comprise an upper set 20, an intermediate set 21, and a lower set 22, the latter converging upon opposite side margins of the trapping compartment or catch basin 19. As thus arranged, corresponding opposed trays, shelves or partitions extend inwardly toward each other from the opposite open sides of the unit, but so that their inner margins terminate short of each other, whereby outgoing upwardly inclined air flow spaces or ducts 23 are provided to lead outwardly and oppositely from the central interior of the unit to, and so as to discharge air from, the opposite sides of said unit into the interior of the air intake housing 10.

The relative arrangement of the trays, shelves or partitioning members may be considered from a somewhat different aspect. Corresponding members of the three sets as they have been termed are disposed in substantially vertical tiers. There are thus two tiers, which are perceptibly inclined from the vertical so that the lowermost partitioning members are closer together than those above them. In this manner, the receiving path for air flow defined between tiers is more constricted at its lower end and will cause increased velocity in the air flow as the catch basin means is approached, thereby adding to the momentum of the suspended solid particles to be precipitated. An additional useful function of the relative inclination of the two tiers as a whole resides in the protrusion of a considerable area of the upper surfaces of lower partitioning members beyond the superimposed members for direct impingement of the downward air flow thereagainst.

It will be understood that the number of trays, shelves or partitions and the air flow spaces or ducts 23 defined thereby may be varied as may be desired in any given case.

Mounted on the upper surface of each tray, shelf or partition is a layer of interstitial separator material 24 of substantial thickness or depth. Said separator material may be composed of any suitable material which is calculated to provide a not too dense interstitial body. For example, said material may comprise a body of loosely aggregated fibrous material, such as spun glass, steel or other metallic wool, vegetable fibers or the like, or it may comprise knitted metallic mesh or other aggregated wire formation, or it may comprise a composite body formed from a plurality of selected materials of the kind mentioned. The layer or body of separator material 24 is affixed to the surface of the supporting tray, shelf or partition in any suitable manner or by any suitable means, as e. g. by cementing the same thereto.

The trays, shelves or partitions may be either fixedly or removably related to the unit structure, but are preferably removably mounted therein subject to withdrawal for either cleaning or replacement. A convenient method of removably mounting said trays, shelves or partitions in the unit structure, as shown, comprises the provision of supporting ledges 25 which are affixed to the inner faces of the unit end walls 15 in suitable locations so as to project therefrom. Corresponding opposed ledges 25 will support a tray, shelf or partition in bridging extension therebetween. To hold the trays, shelves or partitions as thus supported against inward sliding displacement, each thereof is provided at its outer longitudinal margin with a dependent stop flange 26, which, by abutment against outer ends of said ledges 25, prevents any inward sliding displacement of the supported tray, shelf or partition from operative assembled relation to and within the air cleaner unit structure, while nevertheless leaving the same free for outward withdrawal, when removal thereof from the unit structure is desired.

While it is preferably that the air cleaner unit structure be bodily removable from the interior of the air intake housing 10, it may, if desired, be permanently or non-removably mounted or constructed within the latter, so that only the trays, shelves or partitions are withdrawable.

In the operation of the air cleaner means, in the form thereof above described, the air entering through the inlet 11 into the intake housing 10 is caused to pass downward through the air admission opening 17 of the air cleaner unit, and is deflected by the convergent flanges 18 so as to form a down flowing stream centrally within the unit structure intermediate its open sides. Since the thus entering air stream has no means of escape from the interior of the unit except through the open sides thereof, it is compelled to seek escape through the latter, and is consequently forced to turn upwardly for outward flow through the inclined passages 23 leading to said open sides of the unit. By reason of this, the down flowing entering air stream is both caused to change direction from downward to substantially up flowing movement, while at the same time being divided so as to form oppositely moving out going streams. Such change of direction takes place above the trapping compartment or catch basin 19, and consequently, as it occurs, particles of dust or other solids, especially the heavier thereof, which are suspended in the air, will, by reason of momentum derived from the down movement of the air and their inertia, tend to continue such downward movement, with the result that the same are precipitated from the air stream, as change of direction of the latter occurs, so as to be separated from the air stream and thence caused to drop into and be collected within the trapping compartment or catch basin 19.

As the downward moving air within the air cleaner unit turns to flow upwardly and outwardly through the outlet spaces or ducts 23, the volume thereof will be divided into a plurality of outgoing streams each of relatively small volume, and said individual air streams will be caused, during outward movement through the spaces or ducts 23, to impinge upon the layers or bodies of interstitial separator material 24 which are disposed contiguous to said spaces or ducts, with the consequence that said material functions to catch and hold back dust and other solid particles precipitated thereupon from said air streams, whereby said particles are separated from the air and are caused to be trapped in the interstices of said separator material 24. By reason of this the air streams, when discharged from the outer ends of spaces or ducts 23, are substantially free from suspended dust and other solid particles, so that thereafter the air, as thus cleaned, may descend through the lower interior of the intake housing 10, to be thence discharged by the blower or fan 12 to suitable air conditioning and distributing means in well known manner.

Referring to Figs. 5 and 6 of the drawings, a somewhat modified form of air cleaner unit or means is thereby shown, which, nevertheless, embodies the general principles and features of this invention. In said modified form of unit, the trays, shelves or partitions 27 are arranged in downwardly and outwardly divergent, vertically spaced pairs centrally of the unit interior, whereby to first divide the air stream, which enters the intake housing 10 through the inlet 11, into oppositely and downwardly moving streams through side passages 28, thence to turn and flow substantially upwardly and inwardly through spaces or ducts 29 intermediate said trays, shelves or partitions 27, for final discharge through a central passage 30 which opens downwardly into the lower interior of the intake housing 10. In said modified construction, the unit is formed to provide dust trapping compartments or catch basins 31 respectively at the lower or bottom ends of the respective side passages 28. The trays, shelves or partitions 27 are faced, on their upper sides, with layers or bodies of interstitial separator material 32, of the kind and for the purposes already above described. As shown in Fig. 6, the trays, shelves or partitions 27 may be constructed so as to be dismountable and removable from the unit; in which case, the end walls of the latter are provided with supporting ledges 33, and the removable trays, shelves or partitions with stop flanges 34 for holding the same in place on said supporting ledges.

Similar to the arrangement in the preferred form of air cleaner unit disclosed in Fig. 1, the partitioning members are disposed in two tiers, but in this instance the latter are inclined downwardly outward for the reason that there are two receiving paths which are at the sides of the intake chamber, the single discharging path being centrally located. Each tier is opposed to a vertical side wall of the chamber so that the desirable downward constriction of the corresponding receiving path is created for the same functions as those produced by the shape of the single receiving path of the Fig. 1 apparatus.

It will be understood, that in operation, except for the reversal of air flow paths, the aforesaid modified construction of air cleaner means will function in substantially the same manner and with the same air cleaning effects as already hereinabove described with reference to the first disclosed form of air cleaner unit.

Since various changes, in addition to those already mentioned, could be made in the air cleaner means above described and as shown in the accompanying drawings without departing from the scope of this invention as defined in the following claims, it is intended that all matter contained in the foregoing description or shown in the accompanying drawings shall be interpreted as illustrative and not in a limiting sense.

I claim:

1. In air cleaning apparatus, an air intake chamber, an air cleaner unit within said air intake chamber with its upper end bridging the cross-sectional area of the latter, said unit comprising end walls having downwardly and inwardly inclined side margins, a series of vertically spaced apart upwardly inclined partitioning members at each side of the unit and respectively extending from an intermediate interior zone of the latter to the respective sides thereof, said intermediate interior zone providing a central descending air flow path within the unit, spaces between said partitioning members providing a plurality of ascending air flow ducts leading outwardly and upwardly from said descending air flow path to respective open sides of the unit, catch basin means extending between said end walls intermediate inner margins of the lowermost partitioning members whereby to close the lower end of said descending air flow path and reflect the air flow into the ascending ducts, and interstitial separator material mounted on the upper faces of said partitioning members contiguous to the ducts formed by the latter.

2. In an air cleaning apparatus, an air intake chamber, an air cleaner unit removably mounted within said air intake chamber with its upper end bridging the cross-sectional area of the latter, said unit comprising end walls having downwardly and inwardly inclined side margins, top wall sections extending between said end walls at opposite sides thereof and terminating in spaced apart inner margins which define an intermediate air inlet opening, downwardly and inwardly inclined deflector flanges dependent from the inner margins of said top wall sections, a series of vertically spaced apart upwardly inclined partitioning members at each side of the unit and respectively extending from an intermediate interior zone of the latter to the respective sides thereof, said intermediate interior zone providing a central descending air flow path leading downwardly from said air inlet opening, spaces between said partitioning members providing a plurality of ascending air flow ducts leading outwardly and upwardly from said descending air flow path to the respective open sides of the unit, catch basin means extending between said end walls intermediate inner margins of the lowermost partitioning members whereby to close the lower end of said descending air flow path and reflect the air flow into the said ascending ducts, and interstitial separator material mounted on the upper faces of said partitioning members contiguous to the ducts formed by the latter.

3. In an air cleaning apparatus, an air intake chamber, air cleaner means bridging the cross-sectional area of the said chamber and including a top wall having a central inlet opening, two series of relatively spaced partitioning members in the form of flat baffle plates faced with dust catching means and arranged with their broad faces substantially parallel and in two tiers at opposite sides of the inlet opening to divide the cleaner means into a central vertical receiving path for incoming air flow leading directly downward from the inlet opening and laterally disposed discharging paths for continuation of the air flow, the partitioning members being individually inclined at an acute angle with respect to the receiving path to afford ducts therebetween adapted to deflect and conduct the air flow in several branches from the receiving path into the discharging paths in an abruptly changed direction, the two tiers of partitioning members being inclined as a whole downwardly toward each other to constrict the receiving path toward its bottom terminus and thereby increase the velocity of flow and also cause greater protrusion of succeeding partitioning members into the air stream, and catch basin means located between and merging with the adjacent edges of the lowermost partitioning members of both tiers to reflect the air flow in an abruptly reversed direction against the superimposed partitioning members and into the said ducts whereby most of the solid particles suspended in the air stream will be precipitated upon the catch basin means and remaining particles will be precipitated upon the partitioning members.

WALTER TRUBENBACH.

REFERENCES CITED

The following references are of record in the file of this patent:

UNITED STATES PATENTS

| Number | Name | Date |
| --- | --- | --- |
| 1,521,576 | Wittemeier | Dec. 30, 1924 |
| 1,769,072 | Raney | July 1, 1930 |
| 1,917,857 | Searles | July 11, 1933 |
| 2,076,815 | Fulweiler | Apr. 13, 1937 |